(12) United States Patent
Lee et al.

(10) Patent No.: US 6,457,315 B1
(45) Date of Patent: Oct. 1, 2002

(54) HYBRID REFRIGERATION CYCLE FOR COMBUSTION TURBINE INLET AIR COOLING

(75) Inventors: Rong-Jwyn Lee, Sugar Land, TX (US); Jong Juh Chen, Sugar Land, TX (US); Jame Yao, Sugar Land, TX (US); Douglas G. Elliot, Houston, TX (US); Pallav Jain, Durham, NC (US)

(73) Assignee: IPSI, LLC, Houston, TX (US)

( * ) Notice: Subject to any disclaimer, the term of this patent is extended or adjusted under 35 U.S.C. 154(b) by 0 days.

(21) Appl. No.: 10/020,085

(22) Filed: Dec. 7, 2001

Related U.S. Application Data

(60) Provisional application No. 60/251,928, filed on Dec. 7, 2000.

(51) Int. Cl.$^7$ ................................................ F02C 1/00
(52) U.S. Cl. ............................... 60/772; 60/728; 62/333
(58) Field of Search .................. 60/772, 728; 62/238.1, 62/333, 483

(56) References Cited

U.S. PATENT DOCUMENTS 5,203,161 A * 4/1993 Lehto ......................... 60/39.53
6,408,609 B1 * 6/2002 Andrepont .................... 60/728
6,408,643 B1 * 6/2002 Takabatake et al. .......... 62/101

* cited by examiner

Primary Examiner—Charles G. Freay
(74) Attorney, Agent, or Firm—William P. Jensen, Esq.; Shook, Hardy & Bacon L.L.P.

(57) ABSTRACT

A method and apparatus for enhancing the power output and operational efficiency of a combustion turbine system using a combined refrigerant substantially comprising a first refrigerant and a second refrigerant, whereby the combined refrigerant exhibits a total pressure substantially greater than each respective first and second refrigerant at a temperature inside an evaporative chiller. In a preferred embodiment, the combined refrigerant cools turbine inlet air through the exchange of heat from the inlet air, in an air chiller, with a coolant which is cooled by the combined refrigerant in the evaporative chiller. The combined refrigerant, after it is used to cool the coolant in the evaporative chiller, is separated through the use of a liquid absorbent which absorbs the second refrigerant to form a solution pair. The non-absorbed first refrigerant is compressed, condensed and then recirculated to eventually join the second refrigerant which is desorbed from the solution pair in a regenerator. The economic advantage of the present invention is enhanced by thermally linking the heat required to regenerate the second absorptive refrigerant from the solution pair with the hot exhaust of heat available from the gas turbine.

18 Claims, 3 Drawing Sheets

HYBRID REFRIGERATION CYCLE FOR COMBUSTION TURBINE INLET AIR COOLING

CROSS-REFERENCE TO RELATED APPLICATIONS

This application is a continuation of Provisional Application Serial No. 60/251,928, filed on Dec. 7, 2000.

STATEMENT REGARDING FEDERALLY SPONSORED RESEARCH

Not applicable.

BACKGROUND OF THE INVENTION

1. Field of the Invention

The present invention relates generally to systems and methods for increasing the power produced by a gas turbine or combustion turbine for driving a mechanical device or for power generation. More particularly, it provides a more efficient refrigeration method and apparatus for cooling turbine inlet air to enhance its power output and overall combustion efficiency.

2. Background of the Invention

As used herein, the terms turbine, gas turbine and combustion turbine may be used interchangeably in reference to the same or similar process or system. Gas turbines are widely used in all phases of industrial applications. They are utilized as a source of shaft power to drive compressors, aircraft, and other rotating equipment. They are also coupled to electrical power generators for the generation of electricity extensively in either a simple cycle or a combined cycle power plant. Gas turbines typically consist of an intake air filtration, a compressor for compressing inlet air, a combustion chamber for mixing and igniting the compressed air with fuel to form a compressed hot gas for expansion to a turbine section to generate power. The work extracted from the high temperature gas, after partially used for air compression, will be available for output load. The exhaust gas from the turbine section, which contains a high level of heat energy, can be introduced into a waste heat recovery section, e.g. the heat recovery steam generator (HGSG) in a combined cycle power plant, or in some cases, discarded.

The performance of a combustion turbine system operated under the cycle described above is generally proportional to the mass flow rate of the inlet air to the gas turbine compressor, and is therefore largely affected by ambient air conditions. At high ambient temperatures, the available work produced from a gas turbine decreases due to a reduction in the mass flow of air through the system. And ironically, power demand often reaches the peak in most gas turbine applications during the hottest days when the operational efficiency of the turbine is at the lowest. Thus, an inlet air cooling system is commonly adopted to reduce the intake air temperature for minimizing the impact on turbine output, and to augment power output even during hot days when it can be installed cost effectively.

Various methods and apparatus for cooling gas-turbine inlet air are available in the art. For example, U.S. Pat. No. 5,930,990 to Zachary, et al. discloses an apparatus for achieving power augmentation in a gas turbine through a wet compression where water is sprayed to the inlet air to induce "latent heat inter-cooling." Further, a liquid coolant fuel, as exemplified by the disclosure in U.S. Pat. No. 5,806,298, is introduced at the inlet of the air compressor, which vaporizes and cools the air to enhance power output of a gas turbine. Others utilize either a direct or an indirect evaporative cooler where the heat of hot air is transferred into the circulating water, leading to partial vaporization of water. However, the temperature reduction achieved with an evaporative cooler is limited to the daily fluctuating wet bulb temperatures in the areas. An evaporative cooling apparatus may not be applicable for warm and humid areas. Moreover, it often requires a high level of maintenance and relies on the quality and availability of a water source.

It is also readily common to introduce an external refrigeration system to chill the inlet air temperature far below that achievable by an evaporative cooler. This approach permits the turbine to operate at a fairly constant and optimal output regardless of the ambient air conditions. Although chilling the air to near 32° F. is possible, a minimum temperature considered suitable for inlet air chilling in a gas turbine application is usually set above 42° F. This prevents moisture contained in the inlet air from freezing and depositing on the inlet guide vanes or compressor blades as the static air temperature decreases further while it accelerates into the compression chamber. U.S. Pat. No. 5,457,951 discloses the use of liquefied natural gas as a refrigerant to improve the capacity and efficiency of a combined cycle power plant. Liquid nitrogen, as disclosed in U.S. Pat. No. 5,697,207, was also proposed to gain additional power from a gas turbine generator. However, the availability of this type of cold refrigerant is extremely limited. In most areas where a cold refrigerant is not readily available, a refrigeration system is proposed.

In all refrigeration systems, the refrigeration process depends on the absorption of heat at a low temperature which is achieved by the expansion and evaporation of a liquid refrigerant. Refrigeration systems are distinguished by how the refrigerant vapor is liquefied to repeat the cycle. There are two major types of refrigeration systems in commercial practice today, namely absorption refrigeration and mechanical refrigeration. In a typical absorption refrigeration system, a refrigerant vapor from the evaporator is dissolved in a liquid absorbent to form what is commonly referred to as a "solution pair" in an absorber. The solution pair is transferred to a desorber, or regenerator, where heat energy is applied to desorb the refrigerant in the form of a vapor, which is fed to a condenser. The two most commonly used absorption refrigeration systems are ammonia water and aqueous lithium bromide units. U.S. Pat. No. 5,555,738 improves combined-cycle power plant efficiency by operating an ammonia refrigeration cycle driven by the waste heat from the gas turbine to lower the inlet air temperature. Although absorption refrigeration systems are known and utilized commercially, continuous efforts have been devoted to improving their performance. A multiple effect generator is described in U.S. Pat. Nos. 4,183,228; 4,742,693, and 4,441,3332 to improve the efficiency of an absorption refrigeration circuit. U.S. Pat. Nos. 4,283,918 and 4,413,479 introduce a third fluid, which is at least partially immiscible to allow separation of refrigerant at absorption temperature, in the absorption refrigeration cycle. Other improvements include those described in U.S. Pat. Nos. 4,055,964 and 5,816,070. These systems are driven by heat energy and are relatively inefficient and inflexible unless reliable waste heat or inexpensive fuels are readily available.

In a mechanical refrigeration system, the refrigerant vapor is mechanically compressed to a high pressure and is then cooled to total condensation. This type of system has prevailed in industrial installations as a result of the improvement in efficiency. Depending upon temperature requirements, availability, and economics, various pure component refrigerants are commercially available, including light hydrocarbons, ammonia, water, and newly discovered chlorinated fluorocarbons (CFC's). For instance, an inlet air chilling apparatus using water vapor compression is described in U.S. Pat. No. 5,632,148 to achieve power augmentation of a gas turbine. For the modest cooling goal of inlet air chilling, the CFC refrigerants may be most appealing. However, their usage has become increasingly restricted due to environmental regulations. Conventional mechanical refrigeration using a single component refrigerant capable of achieving much colder refrigeration tends to be less efficient. Besides, the need of additional power to drive the compressor reduces the advantages of inlet air chilling.

An enhanced refrigeration system has also been attempted by combining both mechanical refrigeration and absorption refrigeration. For instance, U.S. Pat. No. 5,038,572 discloses a combined refrigeration method and apparatus for an improved efficiency, wherein mechanical refrigeration is alternately connected in series with an aqueous lithium bromide refrigeration. A combustion-powered compound refrigeration system is disclosed in U.S. Pat. No. 4,873,839 to reduce the energy consumption of a refrigeration system wherein the hot exhaust gas from a combustion engine, used to power the refrigerant compressor, is utilized to drive an ammonia absorption unit. U.S. Pat. No. 4,586,344 to Lutz, et al., incorporated herein by reference, introduces a pair of refrigerants which form a substantially immiscible fluid having a total pressure substantially greater than the vapor pressure of either individual refrigerant in the evaporative chiller. This process leads to a higher suction pressure and lower compression horsepower for a mechanical refrigeration system. U.S. Pat. No. 5,816,070 to Mechler teaches the use of vapor recompression absorption to increase the efficiency of an absorption process.

Still others, such as U.S. Pat. Nos. 5,353,597; 5,537,813; and 6,119,445, propose to increase inlet air density by a combination of inlet air compression and cooling.

As can be seen from the foregoing description, prior art has long sought methods for improving operational capacity and efficiency of a gas turbine, particularly in hot weather conditions. While inlet air chilling appears to offer the most advantages, there continues to be a need for improved methods and apparatus to lower costs and energy consumption associated with the provision of such a system.

SUMMARY OF THE INVENTION

It is an object of the present invention to provide a more efficient and economical refrigeration system to augment the power output of a gas turbine. A significant reduction in the power required to drive the refrigerant compressor can be achieved by the addition of an absorptive refrigerant to the evaporative chiller, wherein a substantial increase in pressure results from the combined refrigerant. The absorptive refrigerant vapor from the chiller is subsequently separated from the mechanical refrigerant in an absorber by adding a liquid absorbent, which absorbs the absorptive refrigerant over the mechanical refrigerant.

It is another object of the present invention to reduce the usage of the combustion fuel by utilizing the hot exhaust gas from the gas turbine for the generation of the absorptive refrigerant. Consequently, the emissions of greenhouse gases resulting from the integrated inlet air chilling system can be reduced.

In carrying out these and other objects of the invention, there is provided, in the broadest sense, an inlet air chiller using a combined refrigerant to increase inlet air density for optimizing the performance of a combustion turbine system. The hybrid refrigeration system is based on a combination of mechanical refrigeration supplemented by an absorption refrigeration cycle to reduce the compression requirements over a conventional refrigeration system using a single component refrigerant. At least two refrigerants, a mechanical refrigerant and an absorptive refrigerant, are utilized in the evaporative chiller wherein the combined refrigerant exhibits the characteristic of a much higher total pressure than the vapor pressure of each individual refrigerant at the refrigeration temperature regardless of their miscibility. Preferably, the system includes two substantially immiscible refrigerants which coexist where the total system pressure, in most cases, is approximately equivalent to the sum of the vapor pressures of each refrigerant. This can be exemplified below by a binary propane-ammonia system where experimental vapor pressures representative of such systems were published in *The Journal of Chemical and Engineering Data*, by Noda et al., entitled "Isothermal Vapor-Liquid and Liquid-Liquid Equilibria for the Propane-Ammonia and Propylene-Ammonia Systems."

| Temperature, °F. | Pressure[a], psia | Vapor Pressure[b], psia | |
| --- | --- | --- | --- |
| | | Propane | Ammonia |
| 32.0 | 129.4 | 68.6 | 62.4 |
| 68.0 | 238.3 | 121.3 | 124.3 |

[a]Liquid-liquid equipibrium at given temperatures
[b]Vapor pressure of pure component at given temperatures As shown, the vapor pressure of the two co-existing liquid phases (ammonia and propane) is 129.4 psia at 32° F., which is almost double the vapor pressure of each individual pure refrigerant, namely 68.6 psia for propane and 62.4 psia for ammonia. The compression power needed for the refrigerant compressor is greatly reduced due to a higher suction pressure of the resultant refrigerant vapor from the chiller.

In the present invention, the resultant combined refrigerant from the evaporator is preferably preheated to a temperature well above water freezing temperature and then directly fed to an absorber wherein the absorptive refrigerant is separated from the mechanical refrigerant by the addition of a liquid absorbent. The mechanical refrigerant vapor, essentially not soluble in the liquid absorbent, from the absorber is compressed and subsequently condensed. The absorptive refrigerant is heat regenerated from a solution pair in the desorber. By removing one of the refrigerants as in the present invention prior to mechanical compression, the mass flow into the refrigerant compressor, and thereby power requirements, are further reduced. It should be noted that, in some cases, the vaporized combined refrigerant could be compressed to a higher pressure prior to its introduction into the absorber.

The economic advantages of the present invention are further enhanced by thermally linking the heat required to generate the absorptive refrigerant from the solution pair with the hot exhaust heat available from the gas turbine or the refrigerant compressor driver, if available. This is of significant importance when the cost of combustion fuel is expensive and/or the reduction in greenhouse gases emissions is desired.

The operational efficiency can be further improved in another embodiment of the present invention by applying an economizer to the mechanical refrigerant after the expansion of the mechanical refrigerant. The economizer, operated at an intermediate pressure, permits a portion of the flashed refrigerant vapor to be collected and fed to the refrigerant compressor, thus reducing the flow to the chiller and absorber.

BRIEF DESCRIPTION OF THE DRAWINGS

The application and advantages of the invention will become more apparent by reference to the following detailed description in connection with the accompanying drawings, wherein.

DETAILED DESCRIPTION OF THE INVENTION

The present invention provides a method of enhancing the operational capacity and efficiency of a gas turbine system by the application of a combined refrigerant comprising at least two refrigerants wherein the combined refrigerant exhibits a total pressure substantially higher than the vapor pressure of each respective refrigerant inside an evaporative chiller. For purposes of comparison only, an exemplary conventional process will be described with reference to FIG. 1 and compared with the inventive process. The methods of the present invention will be described with reference to FIGS. 2, and 3.

Figure 1:
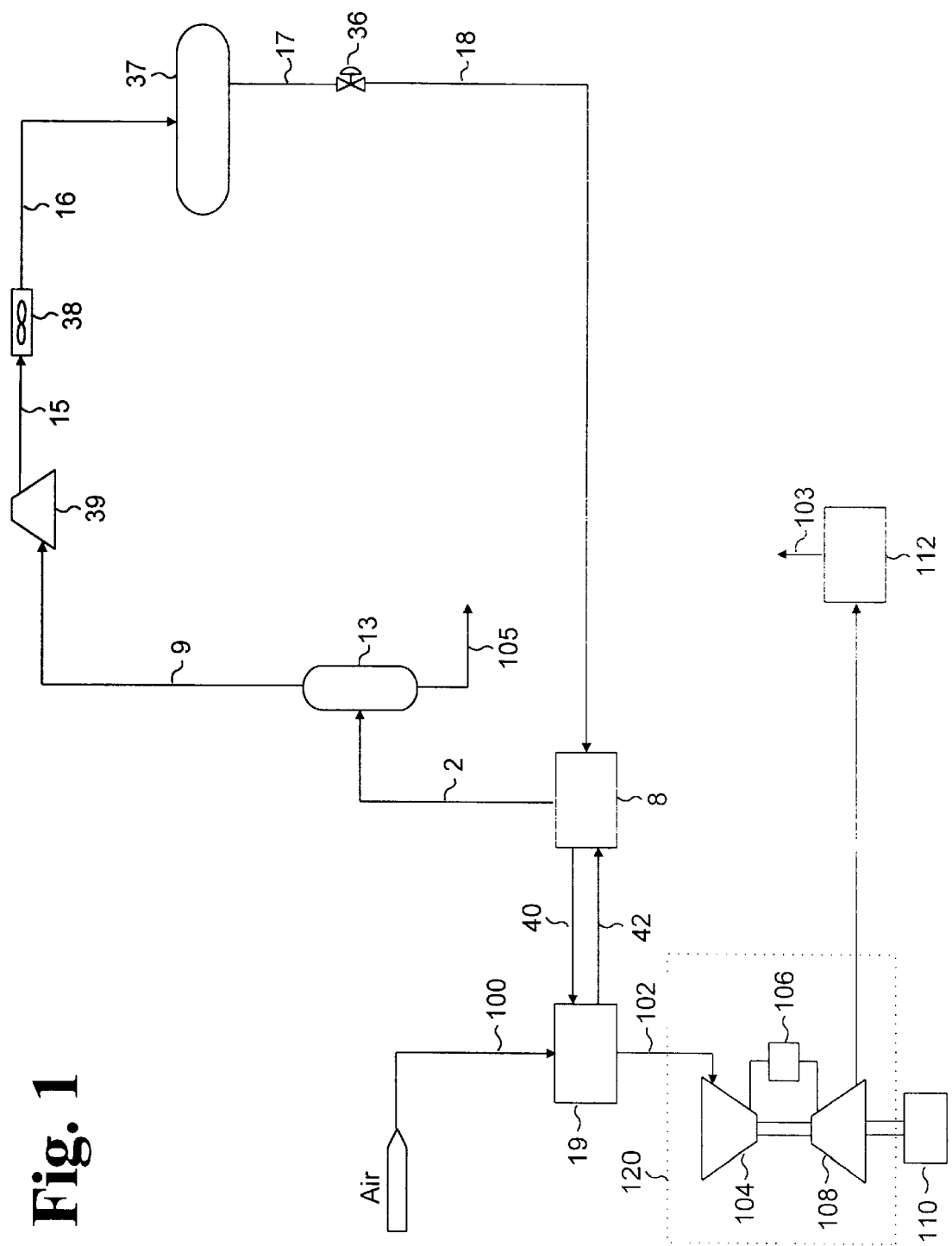
FIG. 1 is a schematic representation of a conventional inlet air chilling process where only mechanical refrigeration is used.

Referring to FIG. 1, inlet air stream 100 having a mass flow rate of approximately 995 lb/sec and 60% relative humidity is introduced into an air chiller 19 at an ambient temperature of about 90° F. and a pressure close to 14.7 psia. The inlet air stream 100 enters the air chiller 19, which utilizes a coolant 40, e.g. a chilled ethylene glycol-water solution, to significantly cool the inlet air stream 100 to a temperature of about 50° F. Cooled air 102 is then introduced into an air compressor 104 which compresses the cooled air 102 before it is supplied to a combustor 106. Fuel is added to the compressed air and ignited in combustor 106 to form a compressed hot gas for expansion in a turbine 108 to generate power for driving device 110. Gas exhausted from turbine 108 may be directed to waste heat recovery unit 112 before being sent to the atmosphere through vent 103. The air. compressor 104, combustor 106 and turbine 108 form a conventional gas turbine 120.

Warm coolant 42 from air chiller 19 enters an evaporative chiller 8 where a conventional single refrigerant stream 18, such as propane in this example, is supplied to the evaporative chiller 8 at approximately 35° F. to cool the warm coolant 42. The cooled coolant 40 returns to air chiller 19 for use in cooling the inlet air stream 100. A vapor refrigerant stream 2 from evaporative chiller 8 is directed to a separator 13 to ensure removal of any entrained liquid 105. After the entrained liquid 105 has been separated from the vapor refrigerant stream 2, a refined vapor refrigerant stream 9 enters a suction port of a refrigerant compressor 39. Compressed vapor refrigerant stream 15 is cooled and condensed at approximately 110° F. and 215 psia through a condenser 38 to form a liquid refrigerant stream 16. An accumulator 37 is applied to the liquid refrigerant stream 16 to provide the necessary surge. The liquid refrigerant stream 17 is expanded through expansion valve 36 to reform refrigerant stream 18, which completes the cycle and is repeated.

Figure 2:
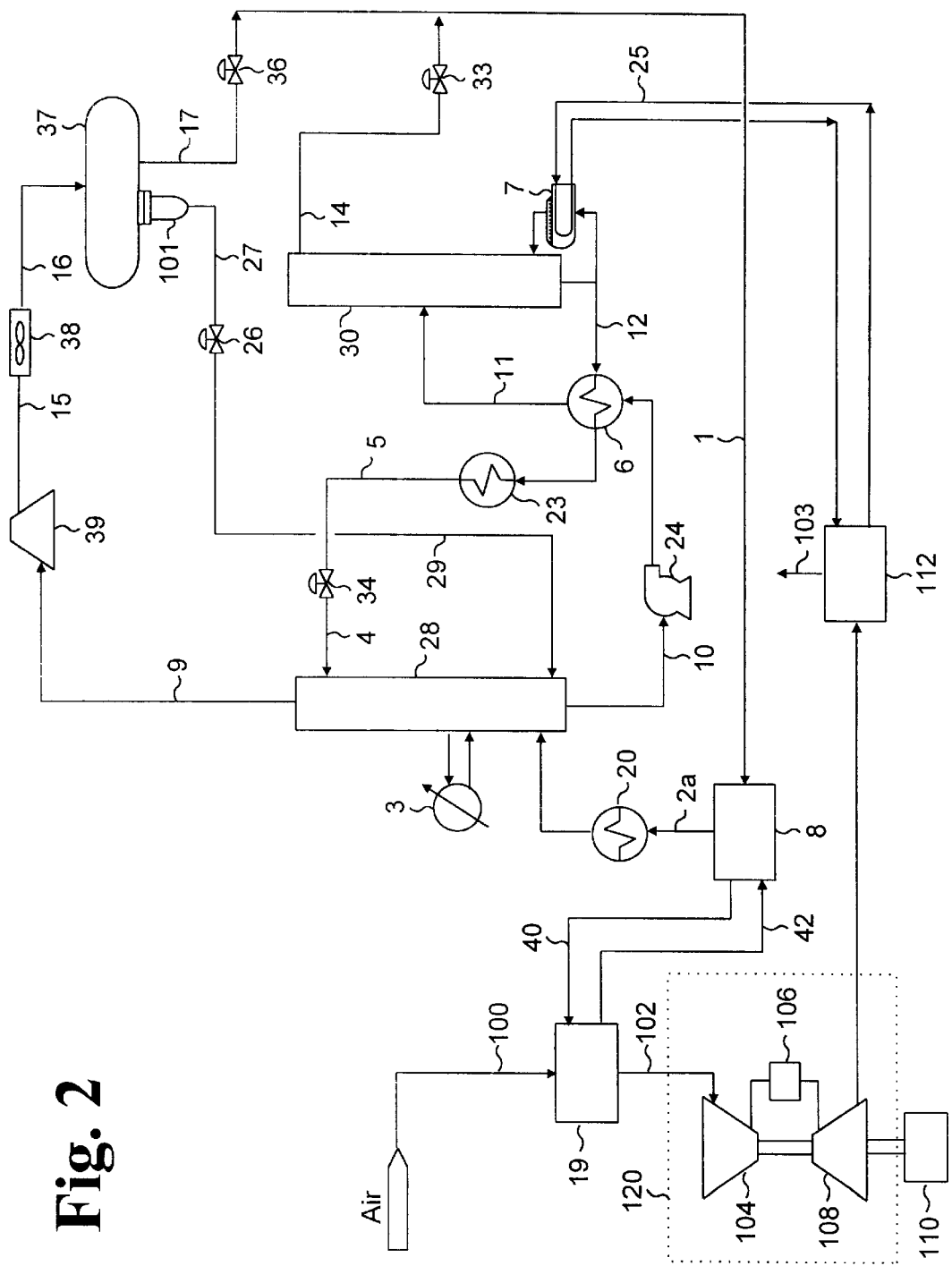
FIG. 2 is a schematic representation of an inlet air chilling process incorporating the improvements of the present invention for augmenting the power produced from a gas turbine.

The methods of the present invention will now be illustrated with reference to FIGS. 2 and 3. FIG. 2 shows a schematic configuration of one embodiment of the present invention, where the same reference numerals are used from FIG. 1 to describe similar streams and equipment. Various values of temperature and pressure are recited in association with the specific example of mixed propane and ammonia refrigeration as described below. These values are merely illustrative, and depend on the desired refrigeration temperature and the combined refrigerant selected.

Referring now to FIG. 2, inlet air stream 100 is cooled to about 50° F. in air chiller 19 as described in reference to FIG. 1. The warm coolant 42 from air chiller 19 enters evaporative chiller 8 where a combined refrigerant stream 1, instead of a conventional single refrigerant stream 18 as described in FIG. 1, is supplied to the evaporative chiller 8 at approximately 35° F. to cool the warm coolant 42. The process of cooling the warm coolant 42, which returns to air chiller 19 as cooled coolant 40, causes substantial vaporization of the combined refrigerant stream 1. As described above, the combined refrigerant stream 1 comprises at least two refrigerants having a total pressure substantially greater than the vapor pressure of each respective refrigerant under the conditions described in reference to the evaporative chiller 8, in FIG. 1, regardless of miscibility. In FIG. 2, the combined refrigerant stream 1 is preferably a combination of a first refrigerant comprising 50 mol % propane (mechanical refrigerant) and a second refrigerant comprising 50 mol % ammonia (absorptive refrigerant) which is supplied to the evaporative chiller 8 at about 134 psia and 35° F.

It should be noted that, depending on the design details of air chiller 19 and the selection of combined refrigerant stream 1, the use of a coolant 40 for transferring refrigeration available from the combined refrigerant stream 1 to the inlet air stream 100 may not be required. Thus, the air chiller 19 and evaporative chiller 8 may be utilized as a single component eliminating the need for a coolant 40.

A substantially vaporized refrigerant stream 2a, substantially comprising the first refrigerant and second refrigerant, exits from evaporative chiller 8 which is supplied to a pre-heater 20 where it is heated to well above 32° F. prior to entering the bottom of an absorber 28. Within absorber 28, the second refrigerant is separated from the first refrigerant by absorption in a cool liquid absorbent 4 which is supplied through the top of absorber 28. To improve the absorption efficiency, an inter-cooler 3 could be included to effectively remove the heat generated by the absorption taking place in absorber 28. The cool liquid absorbent 4 should be selected so that it substantially absorbs the second refrigerant instead of the first refrigerant. For instance, water is a preferred liquid absorbent because of the excellent solubility of the second refrigerant ammonia in water as compared to extremely low solubility of the first refrigerant propane in water.

The refined (non-absorbed) vapor refrigerant stream 9, substantially comprising the first refrigerant, is removed from the absorber 28 at approximately 124 psia and 119° F. Refined vapor refrigerant stream 9 is then compressed to approximately 228 psia by refrigerant compressor 39. The resulting compressed refrigerant vapor stream 15 is then condensed at about 110° F. in condenser 38 to form the liquid refrigerant stream 16, substantially comprising the first refrigerant. Depending upon the power requirement and availability of the fuel source, the driver for the refrigerant compressor 39 can be an electrical motor, a gas engine, a steam turbine, or a gas turbine. Accumulator 37, which is equipped with a water boot 101 for the removal of any water, is applied to the liquid refrigerant stream 16 to provide the necessary surge. A water stream 27 is withdrawn from accumulator 37 and is introduced into the absorber 28 through an expansion valve 26.

A first liquid stream (solution pair) 10, substantially comprising the liquid absorbent 4 and second refrigerant, is drained from the absorber 26 to solution pump 24. Solution pump 24 feeds the first liquid stream 10 to a heat exchanger 6 where it is heat exchanged with a hot liquid absorbent 12 to form a heated solution 11, essentially comprising the first liquid stream 10 at a higher temperature. The heated solution 11 enters a regenerator 30 where a second liquid stream 14, substantially comprising the second refrigerant, is desorbed from the heated solution 11 by an external heat source through a reboiler 7. The liquid absorbent 12, which preferably contains less than 2 mol % of the second refrigerant, is then drained from the regenerator 30 and reintroduced into heat exchanger 6, where it is cooled through the exchange of heat with the first liquid stream 10 as thus described. Thus, once the liquid absorbent 12 is cooled through the heat exchanger 6, it enters absorbent cooler 23 where it is further cooled to form liquid absorbent 5. Liquid absorbent 5 is then expanded through an expansion valve 34 where it is introduced into the absorber 28 as liquid absorbent 4. The regenerator 30 is typically equipped with an overhead condenser and reflux systems, which are not shown. The heat source to the reboiler 7 can be carried by a heating medium 25 through the waste heat recovery unit 112 from the gas turbine 120. Alternatively, the waste heat recovery unit 112 may effectively replace the reboiler 7 as a means of supplying heat to the regenerator, thereby eliminating the need for heating medium 25. Recoverable waste heat is adequate for the heat requirements in most applications, as in this example. There are no additional needs for combustion fuel for the regeneration process. This hybrid refrigeration cycle further reduces the overall requirements of combustion fuel, thereby improving the operational efficiency.

The second liquid stream 14 and liquid refrigerant stream 17 substantially comprise the second refrigerant and first refrigerant, respectively. Each is expanded through respective expansion valves 33 and 36, and are finally combined to reform the combined refrigerant stream 1, thus completing the cycle which is repeated.

For a conventional gas turbine, an increase of approximately 1% in power output can be achieved for every 2.7° F. reduction in inlet air temperature. In this example, the 40° F. reduction in air temperature would result in an approximately 14.8% enhancement in the output of the turbine. More specifically, a power output of approximately 171,000 HP would be available with inlet air chilled to 50° F., which is compared to 146,500 HP without the inlet air chilling.

The required duty for inlet air chilling in such a system is approximately 75 MMbtu/hr. The process performances for providing such duty from the above-mentioned embodiments illustrated in FIG. 1 and FIG. 2 are listed and compared in Table 1 below. As shown, it requires a total compression horsepower of about 2,285 BHP when the combined refrigerant 1 of the present invention illustrated in FIG. 2 is used. This is compared to a total compression horsepower of 8,230 BHP when conventional propane refrigeration demonstrated in FIG. 1 is used. A significant reduction of over 70% in compression horsepower is achieved by the present invention.

TABLE 1

Performance of Conventional and Inventive Processes

| Description | Conventional - FIG. 1 | Inventive - FIG. 2 |
| --- | --- | --- |
| Evaporative Chiller | | |
| Temperature, ° F. | 35 | 35 |
| Refrigerant Flow, Lbmol/hr | 15,334 | 14,203 |
| Refrigeration Duty, MMBtu/hr | 74.8 | 74.8 |
| Refrigerant Compressor 39 | | |
| Suction flow, Lbmol/hr | 15,334 | 7,223 |
| Suction Pressure, psia | 69 | 124 |
| Compression horsepower, BHP | 8,230 | 2,285 |
| Liquid Absorbent Flow, Gal/min | — | 775 |

Figure 3:
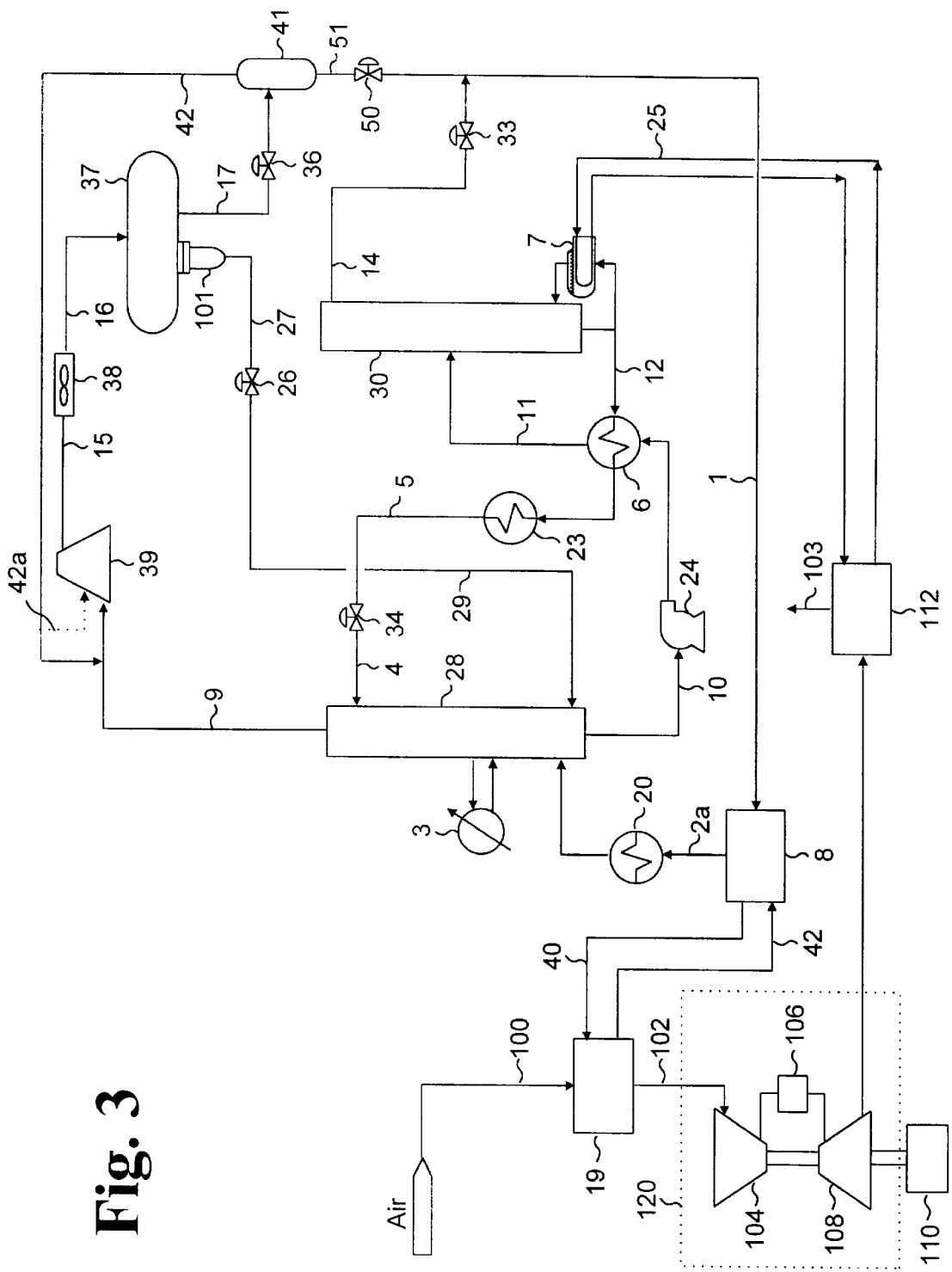
FIG. 3 is an alternative arrangement of an inlet air chilling system incorporating the improvements of the present invention, wherein an economizer for the mechanical refrigerant is introduced.

The operational efficiency of the present invention can be further improved by use of an economizer for the mechanical (first) refrigerant as described in reference to FIG. 3. FIG. 3 represents a schematic embodiment illustrating such an improvement. The system illustrated in FIG. 3 is essentially identical to that described in reference to FIG. 2 and operates in a similar manner, except for the differences detailed below. The same reference numerals have been used to represent the same system components in each figure.

With reference to FIG. 3, the liquid refrigerant stream 17, substantially comprising the first refrigerant, is expanded through expansion valve 36 and transferred to an economizer 41 which is operated at an intermediate pressure. A flashed vapor 42, generated as a result of pressure reduction through expansion valve 36, exits through the top of economizer 41. Flashed vapor 42 is then mixed with vapor refrigerant stream 9 prior to entering the suction port of refrigerant compressor 39. Alternatively, flashed vapor 42 can be supplied to the inter-stage of compressor 39 as shown by 42a when its pressure is considerably higher than that of vapor refrigerant stream 9. After being drained from the bottom of economizer 41, liquid refrigerant stream 51, substantially comprising the first (mechanical) refrigerant, is expanded through an expansion valve 50 and is combined with the expanded liquid stream 14 to form combined refrigerant stream 1 as described above in reference to FIG. 2.

The use of economizer 41 reduces the flashed vapor 42 flowing through the evaporative chiller 8 and subsequent components prior to entering the compressor 39. Consequently, the size and cost of the equipment can be reduced. In addition, a slight improvement in compression horsepower can be realized in some cases.

Depending upon the relative humidity of ambient air, a significant amount of refrigeration may be used for condensing excess moisture. The cool water condensate can be collected in air chiller 19 and used as water markup or liquid absorbent to further improve the overall efficiency.

In the foregoing specification, the invention has been described with reference to specific embodiments thereof, and has been demonstrated as effective in providing structures and processes for enhancing operational efficiency of a combustion turbine. However, it will be evident to those skilled in the art that various modifications and changes can be made thereto without departing from the broader spirit or scope of the invention. Accordingly, the specification is to be regarded in an illustrative rather than a restrictive sense. For example, there may be other ways of configuring and/or operating the inventive integration differently or in association with other combined refrigerants from those explicitly described herein which nevertheless fall within the spirit of the invention. Therefore, the invention is not restricted to the preferred embodiments described and illustrated but covers all modifications, which may fall within the scope of the appended claims.

We claim:

1. A method for enhancing the performance of a combustion turbine system having an air compressor, combustor, and gas expansion turbine, said method comprising the steps of:
   a) cooling inlet air prior to entering said air compressor using a combined refrigerant substantially comprising a first refrigerant and a second refrigerant, said cooling process creating a combined vaporized refrigerant from a substantial vaporization of the combined refrigerant;
   b) contacting said combined vaporized refrigerant with a liquid absorbent to form a vapor stream substantially comprising said first refrigerant and a first liquid stream substantially comprising said second refrigerant and said liquid absorbent;
   c) compressing said vapor stream;
   d) condensing said compressed vapor stream to form at least one liquid phase substantially comprising said first refrigerant;
   e) introducing said first liquid stream into a regenerator wherein heat is applied to desorb said second refrigerant from said liquid absorbent to form a second liquid stream substantially comprising said second refrigerant;
   f) expanding said liquid phase and said second liquid stream; and
   g) combining said expanded liquid phase and said expanded second liquid stream to reform said combined refrigerant for cooling said inlet air.

2. The method of claim 1, wherein said cooling step includes a cooling medium, an evaporator and a chiller for transferring refrigeration available from evaporation of said combined refrigerant in said evaporator to said chiller for cooling said inlet air which passes through said chiller to said air compressor.

3. The method of claim 2, wherein said cooling medium may be selected from the group comprising water, methanol, poly-ethylene glycol having 1 to 3 functional groups of ethylene glycol, or glycerol.

4. The method of claim 1, further comprising the step of compressing said combined vaporized refrigerant prior to said contacting step.

5. The method of claim 1, further comprising the step of preheating said combined vaporized refrigerant prior to said contacting step.

6. The method of claim 1, wherein at least a portion of said heat used in said desorption step is derived from waste heat produced by said gas expansion turbine.

7. The method of claim 1, wherein said combined refrigerant in said cooling step has a total pressure greater than a vapor pressure of each respective first refrigerant and second refrigerant.

8. The method of claim 1, wherein said first refrigerant is propane, said second refrigerant is ammonia, and said liquid absorbent is water.

9. The method of claim 1, further comprising the step of substantially separating any flashed vapor from the expanded liquid phase using an economizer prior to combining said expanded liquid phase and said expanded second liquid stream, said flashed vapor being mixed with said vapor stream either prior to or at the compression step.

10. A method of enhancing the performance of a combustion turbine system having an air compressor, combustor and gas expansion turbine, said method comprising:
   a) cooling inlet air prior to entering said air compressor using a combined refrigerant substantially comprising a first refrigerant and a second refrigerant, said cooling process creating a combined vaporized refrigerant from a substantial vaporization of the combined refrigerant;
   b) contacting said combined vaporized refrigerant with a liquid absorbent to form a vapor stream substantially comprising said first refrigerant and a first liquid stream substantially comprising said second refrigerant and said liquid absorbent;
   c) compressing said vapor stream;
   d) condensing said compressed vapor stream to form at least one liquid phase substantially comprising said first refrigerant;
   e) introducing said first liquid stream into a regenerator wherein heat is applied to desorb said second refrigerant from said liquid absorbent to form a second liquid stream substantially comprising said second refrigerant, at least portion of said heat used in said desorption process being derived from waste heat produced by said gas expansion turbine;
   f) expanding said liquid phase and said second liquid stream; and
   g) combining said expanded liquid phase and said expanded second liquid stream to reform said combined refrigerant for cooling said inlet air.

11. An apparatus for enhancing the performance of a combustion turbine system having an air compressor, combustor, and gas expansion turbine, comprising:
   a) a chiller receiving a combined refrigerant, said combined refrigerant substantially comprising a first refrigerant and a second refrigerant for effectively cooling the inlet air prior to entering said air compressor, said cooling creating a combined vaporized refrigerant from a substantial vaporization of the combined refrigerant;
   b) an absorber receiving a liquid absorbent for contacting said combined vaporized refrigerant to form a vapor stream substantially comprising said first refrigerant and a first liquid stream substantially comprising said second refrigerant and said liquid absorbent;
   c) a compressor for compressing said vapor stream;
   d) a condenser for condensing said compressed vapor stream to form at least one liquid phase substantially comprising said first refrigerant;
   e) a regenerator for desorbing said second refrigerant from said liquid absorbent in said first liquid stream to form a second liquid stream through the application of heat, said second liquid stream substantially comprising said second refrigerant;
   f) a plurality of expansion devices, said plurality of expansion devices used to respectively expand said liquid phase and said second liquid stream; and
   g) a means for combining said expanded liquid phase and said expanded second liquid stream to reform said combined refrigerant for effectively cooling said inlet air.

12. The apparatus of claim 11, further comprising a waste heat recovery unit for the recovery of waste heat produced by said gas expansion turbine to supplement said heat applied in said regenerator.

13. The apparatus of claim 11, further comprising an evaporator, a cooling medium and a chiller, said cooling medium transferring refrigeration available from said combined refrigerant in said evaporator to said chiller for cooling said inlet air which passes through said chiller to said air compressor.

14. The apparatus of claim 13, wherein said cooling medium may be selected from the group comprising water, methanol, poly-ethylene glycol having 1 to 3 functional groups of ethylene glycol, or glycerol.

15. The apparatus of claim 11, wherein said combined refrigerant has a total pressure greater than a vapor pressure of each respective first refrigerant and second refrigerant.

16. The apparatus of claim 11, wherein said first refrigerant is propane, said second refrigerant is ammonia, and said liquid absorbent is water.

17. The apparatus of claim 11, further comprising an economizer for substantially separating any flashed vapor from the expanded liquid phase prior to combining said expanded liquid phase and said expanded second liquid stream.

18. An apparatus for enhancing the performance of a combustion turbine system having an air compressor, combustor, and gas expansion turbine, comprising:

a) a chiller receiving a combined refrigerant, said combined refrigerant substantially comprising a first refrigerant and a second refrigerant for effectively cooling the inlet air prior to entering said air compressor, said cooling creating a combined vaporized refrigerant from a substantial vaporization of the combined refrigerant;

b) an absorber receiving a liquid absorbent for contacting said combined vaporized refrigerant to form a vapor stream substantially comprising said first refrigerant and a first liquid stream substantially comprising said second refrigerant and said liquid absorbent;

c) a compressor for compressing said vapor stream;

d) a condenser for condensing said compressed vapor stream to form at least one liquid phase substantially comprising said first refrigerant;

e) a regenerator for desorbing said second refrigerant from said liquid absorbent in said first liquid stream to form a second liquid stream through the application of heat, said second liquid stream substantially comprising said second refrigerant, at least a portion of said heat used in said desorption process being derived from waste heat produced by said gas expansion turbine;

f) a plurality of expanders, said plurality of expanders used to respectively expand said liquid phase and said second liquid stream; and g) a partially closed system for combining said expanded liquid phase and said expanded liquid stream to reform said combined refrigerant for effectively cooling said inlet air.

* * * * *